United States Patent
Zhou et al.

(10) Patent No.: US 10,963,723 B2
(45) Date of Patent: Mar. 30, 2021

(54) DIGITAL IMAGE TRANSCRIPTION AND MANIPULATION

(71) Applicant: Microsoft Technology Licensing, LLC, Redmond, WA (US)

(72) Inventors: Tiancong Zhou, Issaquah, WA (US); Yong Xie, Sammamish, WA (US); Honghao Qiu, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 193 days.

(21) Appl. No.: 16/231,564

(22) Filed: Dec. 23, 2018

(65) Prior Publication Data

US 2020/0202159 A1 Jun. 25, 2020

(51) Int. Cl.
| | | |
|---|---|---|
| G06F 9/34 | (2018.01) | |
| G06F 40/103 | (2020.01) | |
| G06F 40/166 | (2020.01) | |
| H04L 12/58 | (2006.01) | |
| G06K 9/34 | (2006.01) | |

(52) U.S. Cl.
CPC ............ *G06K 9/344* (2013.01); *G06F 40/103* (2020.01); *G06F 40/166* (2020.01); *H04L 51/22* (2013.01)

(58) Field of Classification Search
CPC ..... G06K 9/344; G06F 40/103; G06F 40/166; H04L 51/22
See application file for complete search history.

(56) References Cited

U.S. PATENT DOCUMENTS

| | | |
|---|---|---|
| 7,174,042 B1 | 2/2007 | Simmons et al. |
| 8,031,943 B2 | 10/2011 | Chen et al. |
| 8,572,275 B2 | 10/2013 | Heggenhougen et al. |
| 2004/0083434 A1 | 4/2004 | Fitch |
| 2005/0190279 A1 | 9/2005 | Nobels |
| 2007/0220425 A1* | 9/2007 | Matulic ............... G06Q 10/107 715/234 |
| 2011/0142344 A1* | 6/2011 | Fukushima ........ G06K 9/00979 382/182 |
| 2012/0189203 A1* | 7/2012 | Lin ........................ G06F 40/18 382/181 |

(Continued)

FOREIGN PATENT DOCUMENTS

| | | |
|---|---|---|
| WO | 2012102884 A2 | 8/2012 |
| WO | 2017163230 A1 | 9/2017 |

OTHER PUBLICATIONS

Google Scholar search results.*

(Continued)

*Primary Examiner* — Qun Shen
(74) *Attorney, Agent, or Firm* — Liang IP, PLLC

(57) ABSTRACT

Computer servers configured to perform digital image processing are discloses herein. In one embodiment, upon receiving a transcription command, a computer server performs text recognition based on patterns in a digital image to generate digital text data corresponding to the digital image. The computer server can then determine a content format of the digital text data based on the imported digital image and automatically apply the determined content format to the generated digital text data. The digital data can then be inserted into an electronic message and transmitted with the inserted typeset digital text data to a destination.

20 Claims, 7 Drawing Sheets

(56) References Cited

U.S. PATENT DOCUMENTS

| | | | |
|---|---|---|---|
| 2013/0004076 A1* | 1/2013 | Koo | G06K 9/325 382/176 |
| 2016/0125391 A1* | 5/2016 | Bekmann | G06K 9/03 382/182 |
| 2016/0179943 A1* | 6/2016 | Ku | G06F 16/335 707/754 |
| 2017/0004374 A1 | 1/2017 | Osindero | |
| 2018/0095733 A1* | 4/2018 | Torman | G06F 40/166 |
| 2018/0114059 A1* | 4/2018 | Ric | G06K 9/52 |

OTHER PUBLICATIONS

"Scribble", Retrieved from: https://web.archive.org/web/20170526131319/http:/www.getscribblenow.com/, Retrieved Date: May 26, 2017, 3 Pages.

Jia, et al., "A Robust Approach to Detecting Text from Images of Whiteboards and Handwritten Notes", In Proceedings of 14th IAPR International Conference on Document Analysis and Recognition, Nov. 9, 2017, pp. 813-818.

Plotz, et al., "Camera-Based Whiteboard Reading: New Approaches to a Challenging Task", In Proceedings of 11th International Conference on Frontiers in Handwriting Recognition, Aug. 19, 2008, 6 Pages.

Spoerri, Anselm, "How to Make Audio/Video as Easy to Use and Share as Text", In Proceedings of the American Society for Information Science and Technology, vol. 39, Issue 1, Nov. 2002, pp. 270-278.

Tu, et al., "System and Method for Automatic Language Detection for Handwritten Text", Application as Filed in U.S. Appl. No. 15/991,383, filed May 29, 2018, 45 Pages.

"Abbyy FineReader Version 10 User's Guide", Retrieved From: https://www.abbyy.com/media/2595/finereader-10-users-guide_english.pdf, 2009, 75 Pages.

Agarwal, Amit, "Search your Handwritten Notes with Gmail OCR—Digital Inspiration", Retrieved From: https://www.labnol.org/internet/gmail-image-recognition/31062/, Jan. 16, 2018, 7 Pages.

Gormish, et al., "Whiteboard Sharing: Capture, Process, and Print or Email", In Proceedings of SPIE, Imaging and Printing in a Web 2.0 World II, vol. 7879, Feb. 7, 2011, 9 Pages.

Pantho, et al., "A System on FPGA for Fast Handwritten Digit Recognition in Embedded Smart Cameras", In Proceedings of the 11th International Conference on Distributed Smart Cameras, Sep. 5, 2017, 6 Pages.

"International Search Report and Written Opinion Issued in PCT Application No. PCT/US19/066431", dated Apr. 29, 2020, 14 Pages.

Trapani, Gina, "Instantly Transcribe a Whiteboard with Your Cameraphone", Retrieved From: https://hbr.org/2009/08/instantly-transcribe-a-whitebo.html, Aug. 3, 2009, 3 Pages.

* cited by examiner

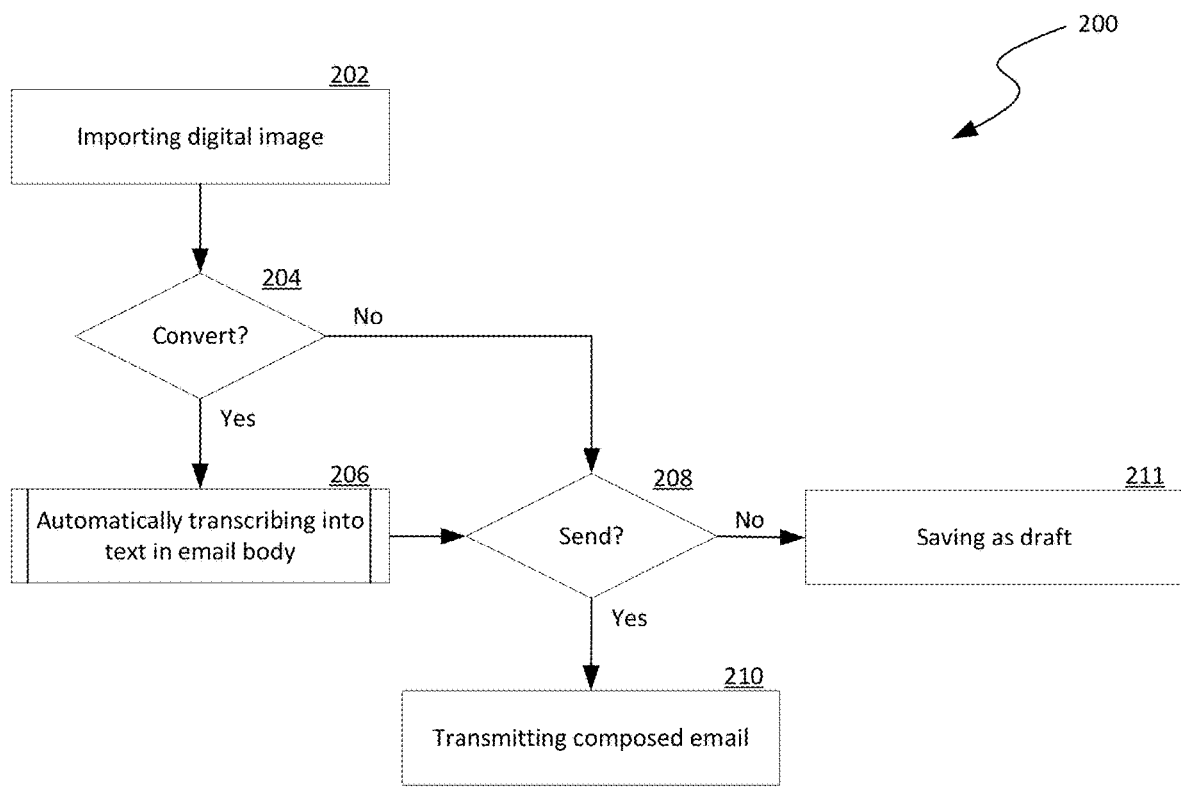
*FIG. 3A*
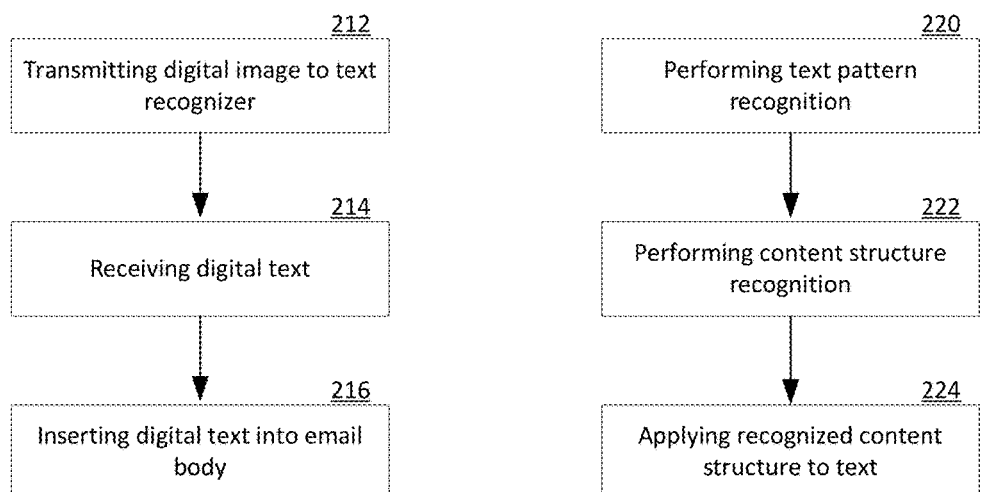
*FIG. 3B*  *FIG. 3C*

DIGITAL IMAGE TRANSCRIPTION AND MANIPULATION

BACKGROUND

Writing on a whiteboard can be an effective way to communicate ideas amongst meeting participants. For example, meeting participants can use makers to write down action items, draw schematics, or reduce other suitable information in writing. Though physical whiteboard has been used for a long time, interactive whiteboards are also in use today. For example, an interactive whiteboard can include a computer with a large touchscreen. A device driver is usually installed on the computer so that the interactive whiteboard can act as a Human Input Device (HID). In one application, the interactive whiteboard can receive input via, for instance, the touchscreen, and display the received input as an image on the touchscreen.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Though whiteboard discussions can be an efficient way to develop strategies, resolve issues, explain design details, etc., summaries or meeting notes of such discussions may be difficult to disseminate electronically as text transcripts. For example, during a whiteboard meeting, meeting participants can handwrite notes of action items as a list with multiple bullet points. A digital image of the notes with the bullet points can be captured using a camera or a function of an interactive whiteboard. The image of the notes can then be attached to an email and transmitted to the meeting participants. However, in order to covert the notes in the captured image as bullet points of text or other suitable forms of digital data, one of the meeting participants (or another person) has to manually type the notes and format typed notes as bullet points according to the captured image. Such manual transcription can be cumbersome and inefficient, and thus negatively impacting productivity of the meeting participants. Also, the manual transcription is also prong to human errors.

Several embodiments of the disclosed technology can address at least some of the foregoing difficulties by implementing automatic transcription of meeting notes based on images of the meeting notes for electronic dissemination. In one implementation, a digital image of meeting notes can be captured from a whiteboard either via a camera or a function of an interactive whiteboard. A user can then start composing a new email (or other suitable types of electronic message) regarding the meeting on a client device in, for instance, an email client. The email client can be a stand-alone application on the client device or a web-based application executing in a web browser. The email can be in Hypertext Markup Language (HTML), Extensible Markup Language (XML), or other suitable types of format.

The user can then use functions in the email client to import the captured digital image of the meeting notes into the email body of the email being composed. In one example, the digital image can be pasted or insert into the email body as an in-line picture. In another example, the digital image can be attached to the email as an attachment. In further examples, the user can import the digital image into the email via other suitable techniques. During email composition, content in the email client may be synchronized with that in a corresponding email server via a computer network. As such, subsequent to importation of the digital image, the email server can also contain a copy of the imported digital image via synchronization with the email client.

The user can then provide a transcription command to convert the imported digital image into a file or data in a text format. The text file can contain a stream of characters, including possible control characters, and can be encoded in one of various character encoding schemes, such as HTML, XML, etc. In one embodiment, the user can actuate a user interface element (e.g., a button) on the email client to provide the command. In other embodiments, the user can actuate a hotkey, a function key, or other suitable input to provide the command. In further embodiments, the email client can be configured to automatically detect the imported digital image and query the user for confirmation to automatically transcribe the digital image. Upon receiving the command, the email client and/or the corresponding email server can transmit the imported digital image along with other suitable information such as a request for transcription, an email identification of the email, authentication credential of the user, etc., to a text recognizer for performing text recognition.

The text recognizer can be configured to perform pattern recognition for recognizing text in the digital image. In one embodiment, the text recognizer can be hosted on a remote server in, for instance, a datacenter. In other embodiments, the text recognizer can be hosted in the email server, the client device, or other suitable types of computing environment. In certain implementations, text recognizer can be configured to perform pattern recognition based on a set of pattern models developed by analyzing a set of digital images with identified text therein using a "neural network" or "artificial neural network" configured to "learn" or progressively improve performance of tasks by studying known examples. In certain implementations, a neural network can include multiple layers of objects generally refers to as "neurons" or "artificial neurons." Each neuron can be configured to perform a function, such as a non-linear activation function, based on one or more inputs via corresponding connections. Artificial neurons and connections typically have a contribution value that adjusts as learning proceeds. The contribution value increases or decreases a strength of an input at a connection. Typically, artificial neurons are organized in layers. Different layers may perform different kinds of transformations on respective inputs. Signals typically travel from an input layer, to an output layer, possibly after traversing one or more intermediate layers. Thus, by using a neural network, the text recognizer can provide a set of pattern models that can be used by the text recognizer to recognize text in the received digital image. In other implementations, the text recognizer can be configured to perform pattern recognition based on user provided rules or via other suitable techniques.

Upon completion of recognizing text in the received digital image, the text recognizer can also be configured to recognize content structures or formats included in the digital image. Example content structures can include a list having bullet points, a table, a paragraph, etc. In certain embodiments, recognition of such content structures can be based on trigger words or keywords (e.g., "1," "2," "3," etc.), punctuations (e.g., bullet points, spaces, etc.), content appearance (e.g., being bold, italic, underlined, etc.), or other characteristics of the recognized text specified in structure models developed using, for instance, a neural network. In other embodiments, recognition of the content structures can be based on relative locations, relative size, or other profiles of the recognized text. In further embodiments, recognition of the content structures can be based on any of the foregoing combinations of techniques.

Upon recognizing the content structure, the text recognizer can be configured to automatically apply the content structure to the recognized text to derive typeset text corresponding to the digital image. For example, the text recognizer can be configured to format the recognized text into a column and insert bullet points or numbers in front of each entry in the column. In another example, the text recognizer can be configured to format the recognized text into a table, a column, a paragraph, or other suitable types of format.

The text recognizer can then be configured to provide data representing the typeset text to the email server. The email server and/or the email client on the client device can then automatically surface the received data in the body of the email being composed in addition to or in lieu of the imported digital image of the meeting notes. The user can then optionally modify the surfaced text, reformat the surface text, or perform other suitable operations. Upon receiving a command from the user to send the email, the email client and the email server can cooperate to transmit a copy of the email to a target destination.

Several embodiments of the disclosed technology can thus efficiently transcribe handwritten notes into digital text data with little or no user intervention. Unlike a user manually typing the meeting notes from the digital image, a single click from the user can cause the digital image to be automatically transcribed into digital text data and inserted into the body of the email during composition. Several embodiments of the disclosed technology can also be more accurate than manual typing the meeting notes by eliminating human error during transcription. As such, productivity of the meeting participants can be increased when compared to manual transcription of the meeting notes.

BRIEF DESCRIPTION OF THE DRAWINGS

FIGS. 3A-3C are flowcharts illustrating example processes of digital image transcription and manipulation in accordance with embodiments of the disclosed technology.

DETAILED DESCRIPTION

Figure 1A:
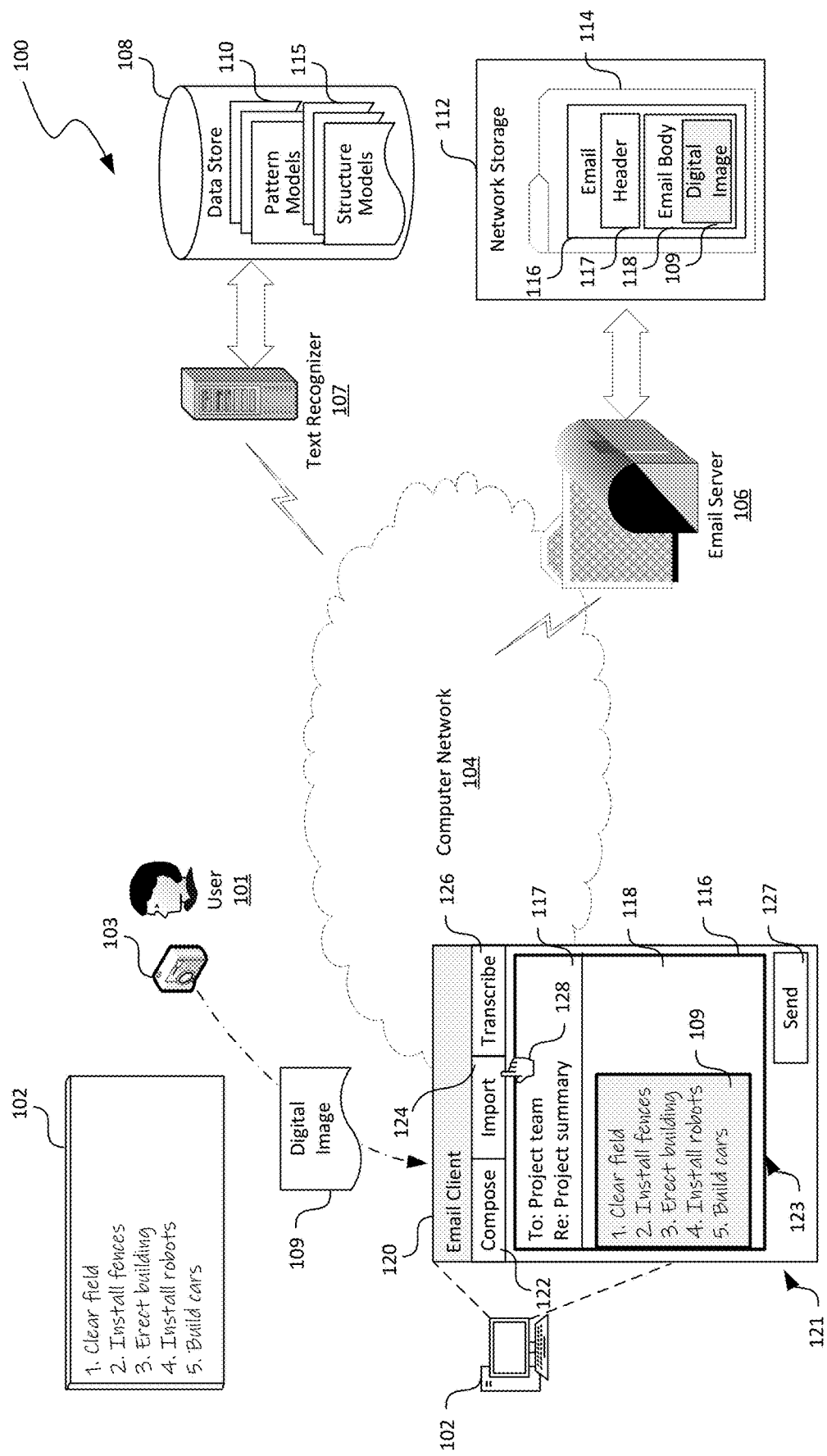
FIGS. 1A-1D are schematic diagrams illustrating a computing system implementing digital image transcription and manipulation during certain stages of operation in accordance with embodiments of the disclosed technology.

Certain embodiments of systems, devices, components, modules, routines, data structures, and processes for digital image transcription and manipulation in computing systems are described below. In the following description, specific details of components are included to provide a thorough understanding of certain embodiments of the disclosed technology. A person skilled in the relevant art will also understand that the technology can have additional embodiments. The technology can also be practiced without several of the details of the embodiments described below with reference to FIGS. 1A-4.

As used herein, the term "email server" generally refers to computer dedicated to running such applications that are configured to receive incoming emails from senders and forward outgoing emails to recipients via a computer network, such as the Internet. Examples of such applications include Microsoft Exchange®, qmail, Exim, and sendmail. An email server can maintain and/or access one or more inboxes for corresponding users. As used herein, an "inbox" is a file folder configured to contain data representing incoming emails for a user. The email server can also maintain and/or access one or more draft folders and/or outboxes configured to store outgoing emails and/or other suitable mailboxes.

Also used herein, a "digital image" generally refers to a digital data representing an image, picture, or other suitable types of graphical entity. Example digital image can be in bitmap, JPEG, or other suitable image formats. The term "digital text data" generally refers to digital data representing characters of readable material but not corresponding graphical representations. Digital text data can include plain text, formatted text, structured text, or other suitable types of text data. Digital text data can be encoded according to various encoding rules, and can also include metadata (or markup data) that can be human readable, such as in HTML, XML, etc.

Further, the term "text recognition" generally refers to a technique for electronic conversion of images of typed, handwritten, or printed text into machine-encoded text. For example, a photo of a document can be converted into machine-encoded text via text recognition to allow characters in the document be copied, edited, or otherwise digitally manipulated. The term "content format" or "content structure" generally refers to an encoded format according to which data can be manipulated as displayable information. Content formats can be used in recording, transmission, and/or preparation of digital data for observation or interpretation.

Though whiteboard discussions can be an efficient way to develop strategies, resolve issues, explain design details, etc., summaries or meeting notes of such discussions may be difficult to disseminate electronically as text transcripts. For example, during a whiteboard meeting, meeting participants can handwrite notes of action items as a list with multiple bullet points. A digital image of the notes with the bullet points can be captured using a camera or a function of an interactive whiteboard. The image of the notes can then be attached to an email and transmitted to the meeting participants. However, in order to covert the notes in the captured image as bullet points of text or other suitable forms of digital data, one of the meeting participants (or another person) has to manually type the notes and format typed notes as bullet points according to the captured image. Such manual transcription can be cumbersome and inefficient, and thus negatively impacting productivity of the meeting participants. Also, the manual transcription is also prong to human errors.

Several embodiments of the disclosed technology can address at least some of the foregoing difficulties by implementing automatic transcription of meeting notes based on images of the meeting notes for electronic dissemination. For example, upon receiving a user command, pattern recognition can be performed on an imported digital image in an email to convert the digital image into digital text data. The converted digital text data can then be automatically inserted into the email in addition to or in lieu of the digital image to be transmitted to a suitable destination. As such, summaries or meeting notes of whiteboard or other types of discussions may be readily disseminated electronically as text transcripts with little or no human error involved, as described in more detail below with reference to FIGS. 1A-4.

FIGS. 1A-1D are schematic diagrams illustrating a computing system 100 implementing digital image transcription and manipulation during certain stages of operation in accordance with embodiments of the disclosed technology. As shown in FIG. 1A, the computing system 100 can include a computer network 104 interconnecting a client device 102 of a user 101, one or more email servers 106 (referred to as "email server 106" here in for simplicity) interconnected with a network storage 112 containing one or more inboxes 114, and a text recognizer 107 interconnected to a data store 108 containing pattern models 110 and structure models 115. The computer network 104 can include an intranet, a wide area network, the Internet, or other suitable types of network.

Even though particular components of the computing system 100 are shown in FIG. 1A, in other embodiments, the computing system 100 can also include additional and/or different components or arrangements. For example, the computing system 100 can also include additional network storage devices, additional hosts, and/or other suitable components (not shown). In other embodiments, the network storage 112 and/or the data store 108 may be integrated into the email server 106.

As described in more detail below, various components of the computing system 100 can be configured to cooperate and perform automatic transcription and manipulation on digital images, such as a digital image 109 taken by the user 101 of a whiteboard 102 holding visible content. In the illustrated example, the content on the whiteboard 102 includes a handwritten numbered list of action items as follows:
  1. Clear field
  2. Install fences
  3. Erect building
  4. Install robots
  5. Build cars In other examples, the content on the whiteboard 102 can also include a list with bullet points, paragraphs, sentences, graphical sketches, or other suitable types of content.

In certain embodiments, the whiteboard 102 can be a physical whiteboard 102 upon which the content can be handwritten. The user 101 can then take a digital image 109 of the content on the whiteboard 102 using, for instance, a camera 103, a smartphone, or other suitable devices. The digital image 109 can then be uploaded or otherwise transmitted, via a wireless or wired connection, from the camera 103 to the client device 102 for further processing. In other embodiments, the whiteboard 102 can be an interactive whiteboard configured to generate the digital image 109 directly by, for instance, capturing a photo of the content on the whiteboard 102 and transmitting the captured phot as a digital image 109 to the client device 102. Though the whiteboard 102 is used in FIG. 1A as an example of a physical medium for holding handwritten content (e.g., the list shown above), in further embodiments, the computer system 100 can also perform automatic transcription and manipulation on displayed content captured from a blackboard, a monitor screen, or other suitable types of output device.

The client devices 102 can each include a computing device that facilitates the user 101 to access computing services provided by the email server 106 via the computer network 104. For example, in the illustrated embodiment, the client device 102 includes a desktop computer. In other embodiments, the client devices 102 can also include a smartphone, a laptop, a tablet, a gaming console, or other suitable computing device. Even though one user 101 is shown in FIG. 1A for illustration purposes, in other embodiments, the computing system 100 can facilitate any suitable number of users 101 to access suitable types of computing services provided by the email server 106.

As shown in FIG. 1A, the client device 102 can configured to execute suitable instructions to provide an email client 120 to the user 101. In certain embodiments, the email client 120 can be a standalone application, such as Microsoft Outlook®. In other embodiments, the email client 120 can be a web-based application, such as, Google Gmail®. In the illustrated example, the email client 120 can include a user interface 121 with multiple control elements, such as a "Compose" button 122, an "Import" button 124, a "Transcribe" button 126, and a "Send" button 127.

The user interface 121 can also include a working area 123 for facilitating composing, editing, viewing, or other suitable operations associated with email services. For instance, the working area 123 can be configured to facilitate composition of a draft email 116 from the user 101 regarding the content on the whiteboard 102 upon the user 101 actuating the "Compose" button 122. The email 116 can include a header 117 having, for example, a "To:" field, a "Re:" field, a "From:" field, "Cc:," field, and/or other suitable data fields. Only the "To:" field and "Re:" field are shown in FIG. 1A for brevity. In the illustrated example, the "To:" field can contain a distribution list for "Project team" while the "Re:" field can contain a subject line, i.e., "Project summary."

In certain implementations, the user 101 can actuate the "Import" button 124, as represented by the cursor 128, to insert the digital image 109 into a body section 118 of the draft email 116. In one example, the camera 103 can be connected to the client device 102 via a wired or wireless connection and treated by the client device 102 as an external drive. As such, upon detecting actuation of the "Import" button 124, the email client 120 can be configured to show a pop-up window (not shown) that allows the user 102 to browse through files on the camera 103 and select the digital image 109 for importation. In other examples, the user 101 can copy and paste the digital image 109 from the camera 103 into the body section 118 of the draft email 116. In further examples, the email client 120 can be configured to insert the digital image 109 into the body section 118 of the draft email 116 in other suitable manners.

The email server 106 can be configured to facilitate email reception, storage, forwarding, and other related functionalities. For example, as shown in FIG. 1A, the user 101 can have a corresponding email folder 114 in the network storage 112. The email folder 114 can be configured to contain copies of emails 116 that are received, sent, deleted, etc. The email folder 114 can also be configured to contain copies of draft emails 116 that are being composed on the client device 102 via, for instance, periodic synchronization with the email client 120 on the client device 102. For example, the email folder 114 of the user 101 on the network storage 112 can have a server copy of the draft email 116 in the email client 120 along with a copy of the inserted digital image 109.

Figure 1B:
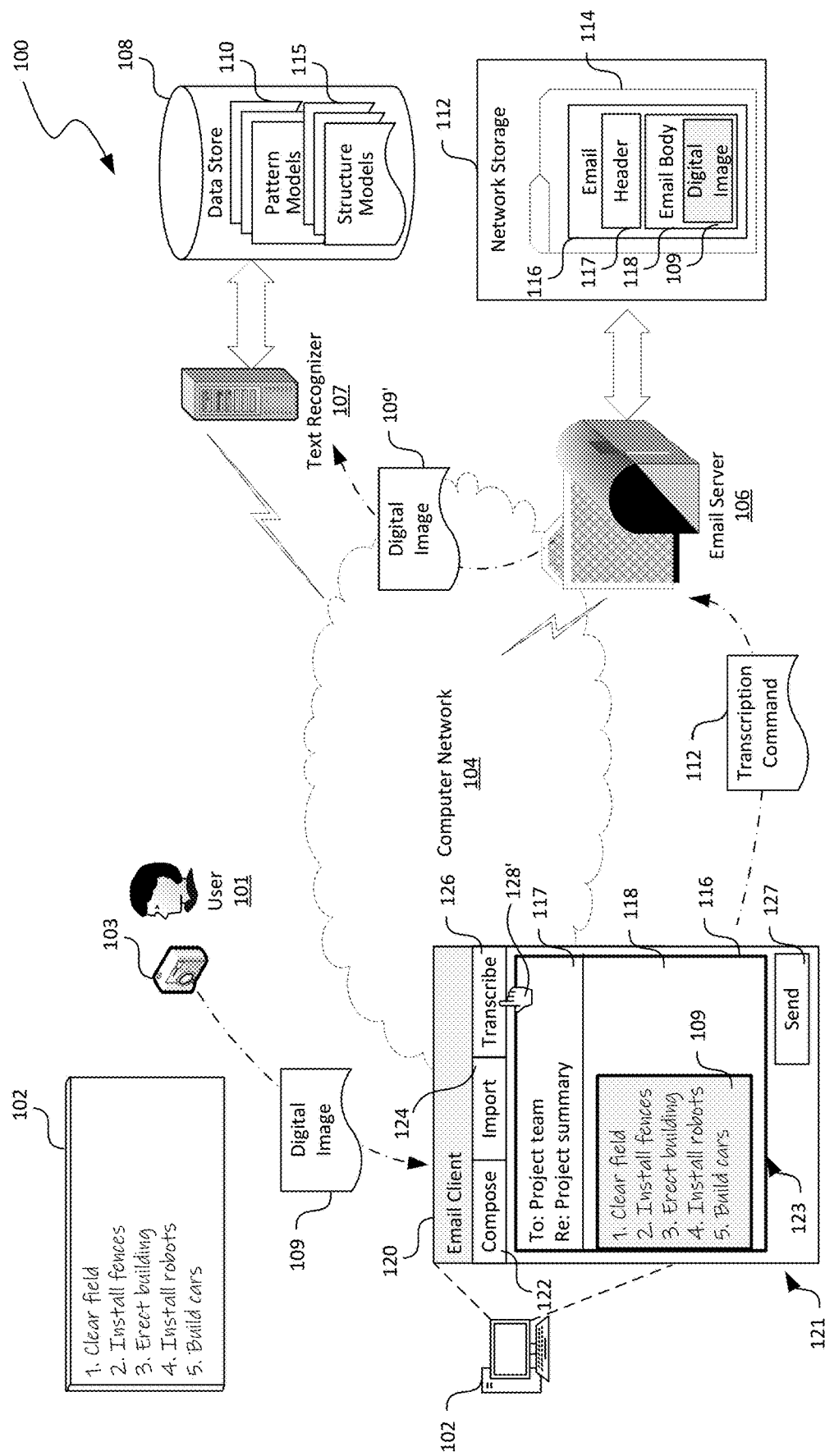

Upon inserting the digital image 109 into the body section 118 of the draft email 116, in certain embodiments, the user 101 can actuate the "Transcribe" button 126 to automatically transcribe the content in the digital image 109 (i.e., the list of action items) into digital text data 114 (shown in FIG. 1C) without having the user 101 to manually type in the list. For example, as shown in FIG. 1B, upon receiving actuation on the "Transcribe" button 126, as represented by the cursor 128', the email client 120 and/or other suitable components of the client device 102 can be configured to transmit, via the computer network 104, a transcription command 112 to the email server 106. In certain embodiments, the transcription command 112 can include a request for transcription of the digital image 109, an image identification or a copy of the digital image 109, an email identification of the draft email 116, authentication credential of the user 101, and/or other suitable information. In further embodiments, the email client 120 can be configured to automatically detect the imported digital image 109 and query the user 101 for confirmation to automatically transcribe the digital image 109.

Upon receiving the transcription command 112, the email server 106 can provide a copy of the digital image 109' to the text recognizer 107 along with a request to transcribe content in the digital image 109'. In the illustrated example in FIG. 1B, the text recognizer 107 is shown as a separate server from the email server 106. In another example, the text recognizer 107 can be a part of the email server 106. In further examples, the text recognizer 107 can include one or more computing services hosted on other suitable servers (not shown), for example, in a datacenter.

The text recognizer 107 can be configured to perform pattern and structure recognition for recognizing text in the digital image 109 based on the pattern models 110 and structure models 115 in the data store 108. In certain embodiments, the pattern models 110 and structure models 115 can be developed via machine learning, as described in more detail below with reference to FIG. 2. In other embodiments, the pattern models 110 and structure models 115 can also include rules configured by the user 101 or other suitable entities. In certain implementations, the pattern models 110 can include parameters of shapes, positions, relative sizes, and/or other suitable values that correspond to a particular character. For instance, a shape with a dot on top of a vertical line can correspond to letter "i." The structure models 115 can include trigger words or keywords (e.g., "1," "2," "3," etc.), punctuations (e.g., bullet points, spaces, etc.), content appearance (e.g., being bold, italic, underlined, etc.), or other characteristics of the recognized text individually correspond to a text structure or format. In other implementations, the pattern models 110 and/or the structure models 115 can include other suitable rules, parameters, features, or attributes for recognizing characters and text structures.

Figure 1C:
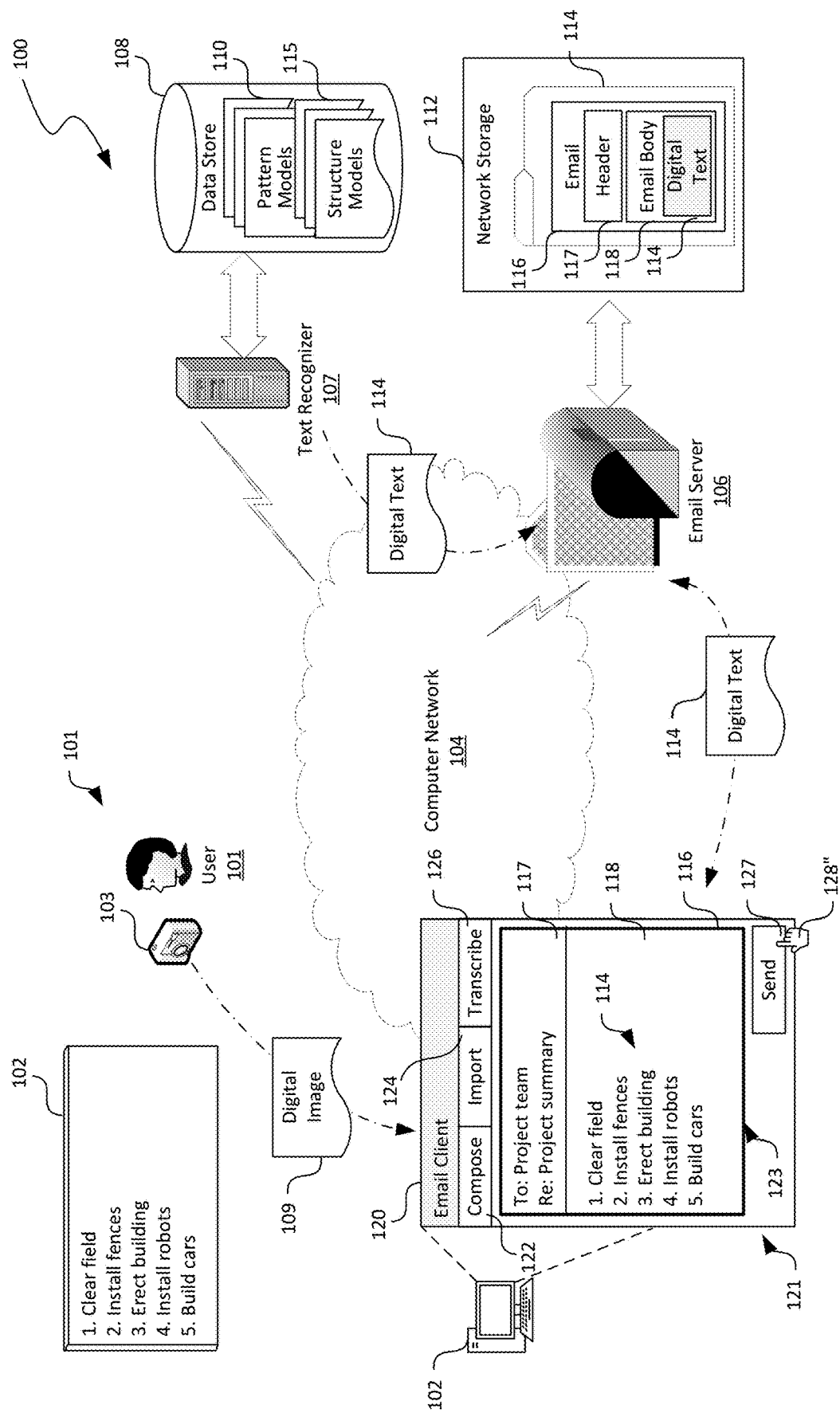
Figure 1D:
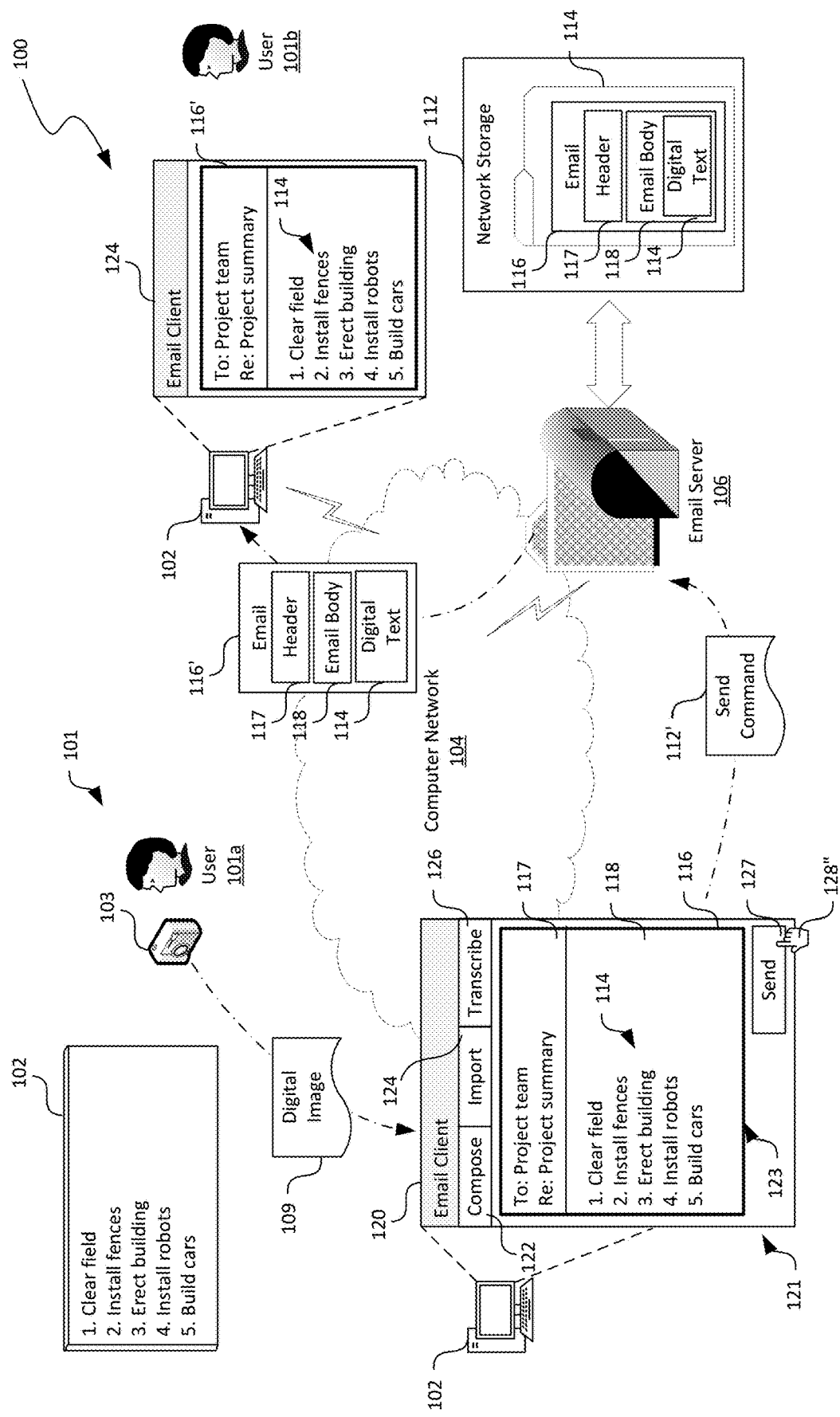

As shown in FIG. 1C, the text recognizer 107 can be configured to utilize the pattern models 110 to transcribe content in the digital image 109' into digital text data 114 and recognize content structures or formats included in the digital image 109'. The text recognizer 107 can then apply the recognized content format to the digital text data 114 to generate typeset digital text data 114. The text recognizer 107 can then transmit the typeset digital text data 114 to the email server 106 for insertion into the body section 118 of the draft email 116. Example components and operations of the text recognizer 107 are described in more detail below with reference to FIG. 2.

Upon receiving the typeset digital text data 114, the email server 106 can insert the digital text data 114 into the body section 118 of the server copy of the draft email 116 in addition to or in lieu of the digital image 109. Through periodic synchronization or other suitable techniques, the digital text data 114 can also be transmitted to the client device 102 and surface to the user 101 in the body section 118 on the email client 120 in addition to or in lieu of the digital image 109. The user 101 can then optionally modify the surfaced digital text, reformat the surface digital text, or perform other suitable operations. For example, the user 101 can now copy and paste some or all of the digital text data 114 into another portion of the body section 118. Upon receiving a command from the user 101 to send the email, for example, by actuating the "Send" button as represented by the cursor 128", the email client 120 and the email server 106 can cooperate to transmit a copy of the email 116 to a target destination, such as another client device 102 of another user 101b with the digital text data 114 instead of the digital image 109.

Several embodiments of the disclosed technology can thus efficiently transcribe handwritten notes contained in the digital image 109 into digital text data 114 with little or no user intervention. Unlike the user 101 manually typing the meeting notes from the digital image, a single click from the user can cause the digital image 109 be automatically transcribed into digital text data 114 and inserted into the body section 118 of the email 116 during composition. Several embodiments of the disclosed technology can also be more accurate than manual typing the meeting notes by eliminating human error during transcription. As such, productivity of the meeting participants, such as the users 101a and 101b, can be increased when compared to manual transcription of the meeting notes.

Figure 2:
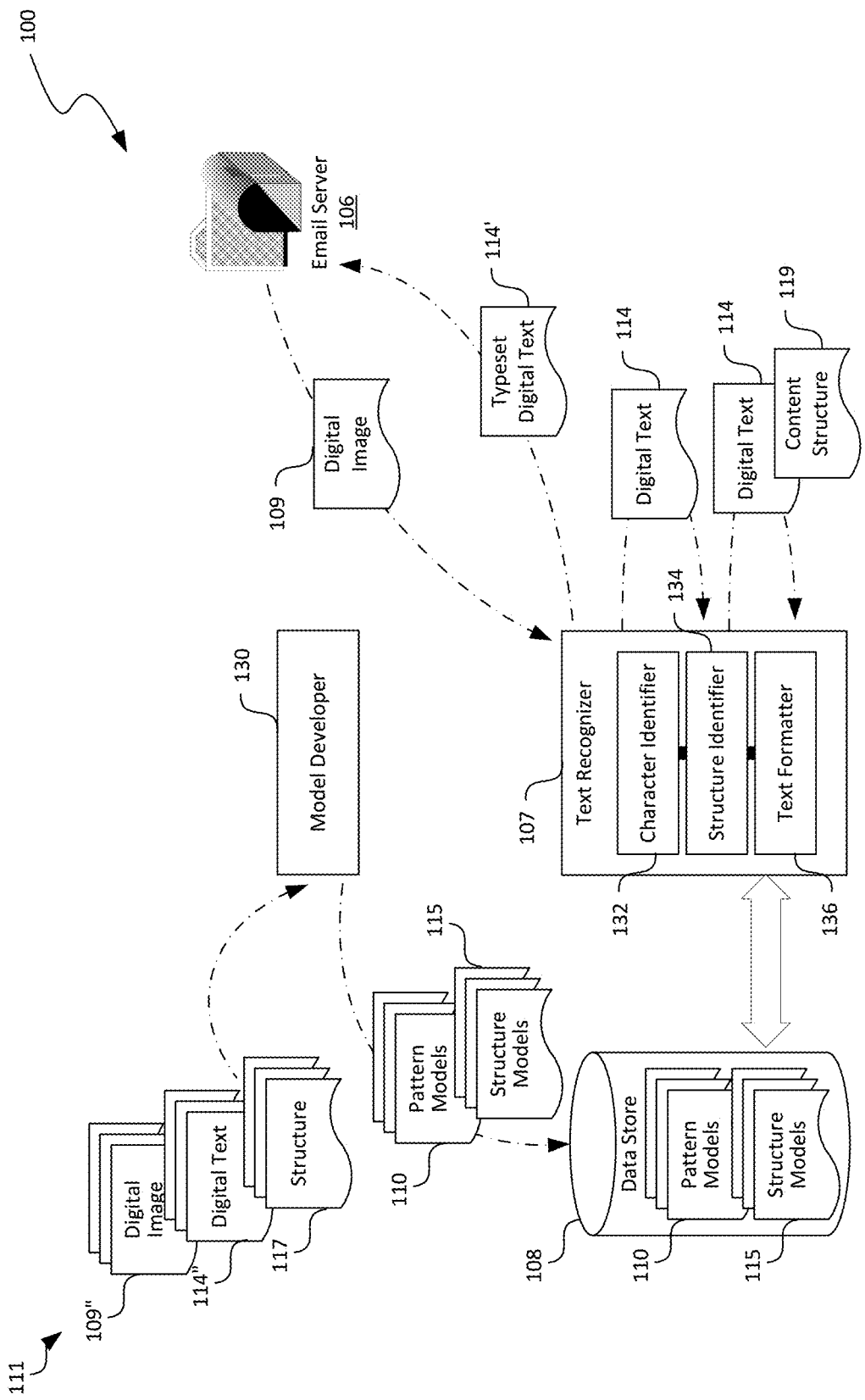
FIG. 2 is a schematic diagram illustrating certain hardware/software components of the computing system of FIG. 1 in accordance with embodiments of the disclosed technology.

FIG. 2 is a schematic diagram illustrating certain hardware/software components of the computing system 100 in accordance with embodiments of the disclosed technology. In FIG. 2, only certain components of the computing system 100 of FIGS. 1A-1D are shown for clarity. In FIG. 2 and in other Figures herein, individual software components, objects, classes, modules, and routines may be a computer program, procedure, or process written as source code in C, C++, C#, Java, and/or other suitable programming languages. A component may include, without limitation, one or more modules, objects, classes, routines, properties, processes, threads, executables, libraries, or other components. Components may be in source or binary form. Components may include aspects of source code before compilation (e.g., classes, properties, procedures, routines), compiled binary units (e.g., libraries, executables), or artifacts instantiated and used at runtime (e.g., objects, processes, threads).

Components within a system may take different forms within the system. As one example, a system comprising a first component, a second component and a third component can, without limitation, encompass a system that has the first component being a property in source code, the second component being a binary compiled library, and the third component being a thread created at runtime. The computer program, procedure, or process may be compiled into object, intermediate, or machine code and presented for execution by one or more processors of a personal computer, a network server, a laptop computer, a smartphone, and/or other suitable computing devices.

Equally, components may include hardware circuitry. A person of ordinary skill in the art would recognize that hardware may be considered fossilized software, and software may be considered liquefied hardware. As just one example, software instructions in a component may be burned to a Programmable Logic Array circuit or may be designed as a hardware circuit with appropriate integrated circuits. Equally, hardware may be emulated by software. Various implementations of source, intermediate, and/or object code and associated data may be stored in a computer memory that includes read-only memory, random-access memory, magnetic disk storage media, optical storage media, flash memory devices, and/or other suitable computer readable storage media excluding propagated signals.

As shown in FIG. 2, the computing system 100 can include a model developer 130 and a text recognizer 107 operatively coupled to each other. Though the model developer 130 is are shown in FIG. 2 as a separate component of the text recognizer 107, in other embodiments, the model developer 130 can be integrated with the text recognizer 107. In further embodiments, the model developer 130 can be provided by one or more other online or offline servers (not shown) separate from the text recognizer 107.

The model developer 130 can be configured to develop and generate the pattern models 110 and the structure models 115 via various machine learning techniques based on a training dataset 111 containing digital images 109" and associated digital text 114" and structure 117. The associated digital text 114" and structure 117 can be manually generated, automatically generated via unstructured learning, or via other suitable techniques. In one implementation, the model developer 130 can be configured to use a neural network that includes multiple layers of objects generally refers to as "neurons" or "artificial neurons" to perform machine learning based on the training dataset 111. By using the neural network, the model developer 130 can provide a set of pattern models 110 and the structure models 115 that can be used by the text recognizer 107 for automatic transcription and formatting operations. In one example, the pattern models 110 can include various values of variables related to the digital images 109". Example variables can include geometric shapes, sizes, spatial arrangements, and/or other suitable parameters. As such, one example pattern model 110 can include an indication that a portion of a digital image 109" represents letter "o" when the portion of the digital image has a generally circular shape. In other examples, the pattern models 110 can have other suitable features and attributes. In the illustrated embodiment, the model developer 130 provides the pattern models 110 and the structure models 115 to be stored at the data store 108. In other embodiments, the model developer 130 can provide the pattern models 110 and/or the structure models 115 directly to the text recognizer 107, or store the pattern models 110 in other suitable locations.

As shown in FIG. 2, the text recognizer 107 can include a character identifier 132, a structure identifier 134, and a text formatter 136 operative coupled to one another. Though particular component or modules of the text recognizer 107 are shown in FIG. 2 for illustration purposes, in other embodiments, the text recognizer 107 can also include interface, network, or other suitable types of components and/or modules. In further embodiments, at least one of the foregoing components can be provided by an external application/server separate from the text recognizer 107.

In certain embodiments, at a first stage of transcription processing, the character identifier 132 can identify individual characters in the received digital image 109 based on the pattern models 110 in the data store 108. In one embodiment, the character identifier 132 can scan individual shapes or combinations of shapes in the received digital image 109 and convert them into one or more ASCII or other suitable types of characters, punctuations, special characters, etc. based on the pattern models 110. In other embodiments, the character identifier 132 can also be configured to recognize lines, paragraph breaks, spaces or other suitable types of invisible characters. Upon completion of recognizing the characters in the digital image 109, the character identifier 132 forwards the digital text data 114 to the structure identifier 134 for further processing.

Upon receiving the digital text data 114, the structure identifier 134 can be configured to recognize one or more content structure or format in the digital text data 114 based on the structure models 115. Example content structures can include a list having bullet points, a table, a paragraph, etc. In certain embodiments, recognition of such content structures can be based on trigger words or keywords (e.g., "1," "2," "3," etc.), punctuations (e.g., bullet points, spaces, etc.), content appearance (e.g., being bold, italic, underlined, etc.), or other characteristics of the recognized text specified in structure models developed using, for instance, a neural network. In other embodiments, recognition of the content structures can be based on relative locations, relative size, or other profiles of the recognized text. In further embodiments, recognition of the content structures can be based on any of the foregoing combinations of techniques.

Upon recognizing the content structure, the structure identifier 134 can forward the digital text data 114 and the recognized content structure 119 to the text formatter 136 for further processing. The text formatter 136 can be configured to automatically apply the content structure 119 to the recognized text data 114 to derive typeset text data 114' corresponding to the digital image 109. For example, the text formatter 136 can be configured to format the recognized text data 114 into a column and insert bullet points or numbers in front of each entry in the column. In another example, the text formatter 136 can be configured to format the recognized text into a table, a column, a paragraph, or other suitable types of format.

The text recognizer 107 can then be configured to provide the typeset text data 114' to the email server 106. As described in more detail above with reference to FIGS. 1A-1D, the email server 106 and/or the email client 120 on the client device 102 can then automatically insert and surface the received typeset digital text data in the body section 118 of the email 116 being composed in addition to or in lieu of the imported digital image 109. The user 101 can then optionally modify the surfaced text, reformat the surface text, or perform other suitable operations. Upon receiving a command from the user 101 to send the email 116, the email client 120 and the email server 106 can cooperate to transmit a copy of the email 116 to a target destination.

FIGS. 3A-3C are flowcharts illustrating example processes of automatic summarization of content in electronic messages in accordance with embodiments of the disclosed technology. Even though the processes are described below with reference to the computing system 100 of FIGS. 1A-1D, in other embodiments, the processes can also be implemented in computing systems with additional and/or different components.

As shown in FIG. 3A, a process 200 can include importing a digital image into a body section of a draft email at stage 202. The process 200 can then include a decision stage 204 to determine whether a transcription command to convert the digital image into text is received. In response to determining that a transcription command has been received, the process 200 proceeds to automatically transcribing the digital image into text in the body section of the draft email at stage 206. Example operations of performing such automatic transcription are described in more detail below with reference to FIG. 3B. The process 200 can then proceed to another decision stage 208 to determine whether a send command is received. In response to determining that a send command is received, the process 200 can include transmitting the draft email to a target destination. Otherwise, the process 200 can include saving the email as a draft or perform other suitable operations at stage 211. In response to determining that a transcription command has not been received, the process 200 proceeds directly to the decision stage 208.

As shown in FIG. 3B, the operations can include transmitting a copy of the digital image to a text recognizer at stage 212. The operations can then include receiving digital text data from the text recognizer at stage 214. Example operations performed by the text recognizer to transcribe the digital image are described in more detail below with reference to FIG. 3C. The operations can then include automatically inserting the digital text into the body section of the draft email in addition to or in lieu of the digital image at stage 216.

FIG. 3C is a flowchart illustrates example operations of automatically transcribing a digital image by a text recognizer in accordance with embodiments of the disclosed technology. As shown in FIG. 3C, the operations include performing text pattern recognition at stage 220. The operations can then include performing structure recognition at stage 222. Example implementations of such text pattern recognition and content structure recognition are described above with reference to FIGS. 1A-2. The operations can then include applying the recognized content structure to the recognized text at stage 224.

Figure 4:
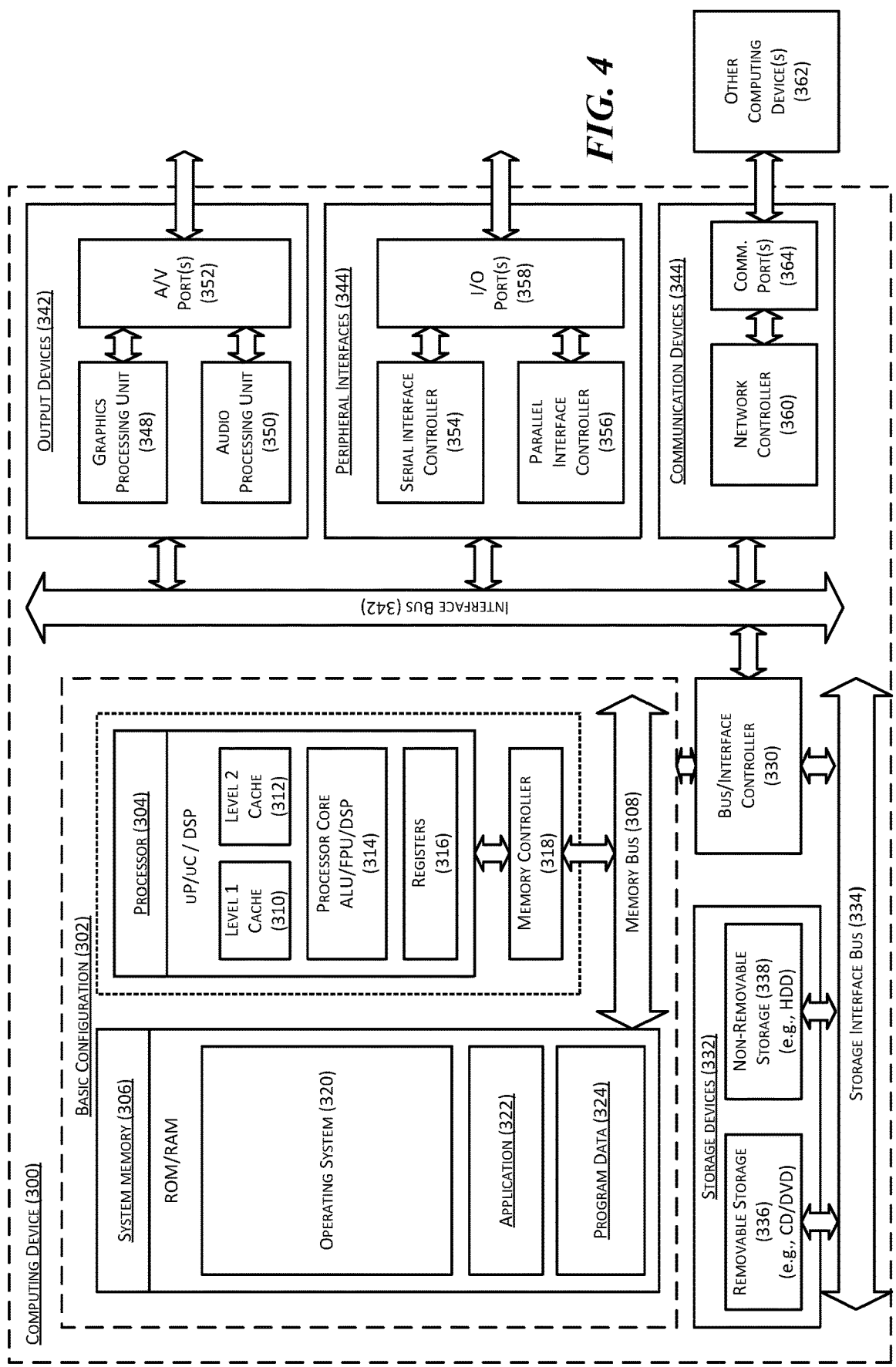
FIG. 4 is a computing device suitable for certain components of the computing system in FIG. 1.

FIG. 4 is a computing device 300 suitable for certain components of the computing system 100 in FIG. 1. For example, the computing device 300 can be suitable for the email server 106, text recognizer 107, or the client devices 102 of FIG. 1A. In a very basic configuration 302, the computing device 300 can include one or more processors 304 and a system memory 306. A memory bus 308 can be used for communicating between processor 304 and system memory 306.

Depending on the desired configuration, the processor 304 can be of any type including but not limited to a microprocessor (µP), a microcontroller (µC), a digital signal processor (DSP), or any combination thereof. The processor 304 can include one more levels of caching, such as a level-one cache 310 and a level-two cache 312, a processor core 314, and registers 316. An example processor core 314 can include an arithmetic logic unit (ALU), a floating-point unit (FPU), a digital signal processing core (DSP Core), or any combination thereof. An example memory controller 318 can also be used with processor 304, or in some implementations memory controller 318 can be an internal part of processor 304.

Depending on the desired configuration, the system memory 306 can be of any type including but not limited to volatile memory (such as RAM), non-volatile memory (such as ROM, flash memory, etc.) or any combination thereof. The system memory 306 can include an operating system 320, one or more applications 322, and program data 324. This described basic configuration 302 is illustrated by those components within the inner dashed line.

The computing device 300 can have additional features or functionality, and additional interfaces to facilitate communications between basic configuration 302 and any other devices and interfaces. For example, a bus/interface controller 330 can be used to facilitate communications between the basic configuration 302 and one or more data storage devices 332 via a storage interface bus 334. The data storage devices 332 can be removable storage devices 336, non-removable storage devices 338, or a combination thereof. Examples of removable storage and non-removable storage devices include magnetic disk devices such as flexible disk drives and hard-disk drives (HDD), optical disk drives such as compact disk (CD) drives or digital versatile disk (DVD) drives, solid state drives (SSD), and tape drives to name a few. Example computer storage media can include volatile and nonvolatile, removable and non-removable media implemented in any method or technology for storage of information, such as computer readable instructions, data structures, program modules, or other data. The term "computer readable storage media" or "computer readable storage device" excludes propagated signals and communication media.

The system memory 306, removable storage devices 336, and non-removable storage devices 338 are examples of computer readable storage media. Computer readable storage media include, but not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other media which can be used to store the desired information and which can be accessed by computing device 300. Any such computer readable storage media can be a part of computing device 300. The term "computer readable storage medium" excludes propagated signals and communication media.

The computing device 300 can also include an interface bus 340 for facilitating communication from various interface devices (e.g., output devices 342, peripheral interfaces 344, and communication devices 346) to the basic configuration 302 via bus/interface controller 330. Example output devices 342 include a graphics processing unit 348 and an audio processing unit 350, which can be configured to communicate to various external devices such as a display or speakers via one or more A/V ports 352. Example peripheral interfaces 344 include a serial interface controller 354 or a parallel interface controller 356, which can be configured to communicate with external devices such as input devices (e.g., keyboard, mouse, pen, voice input device, touch input device, etc.) or other peripheral devices (e.g., printer, scanner, etc.) via one or more I/O ports 358. An example communication device 346 includes a network controller 360, which can be arranged to facilitate communications with one or more other computing devices 362 over a network communication link via one or more communication ports 364.

The network communication link can be one example of a communication media. Communication media can typically be embodied by computer readable instructions, data structures, program modules, or other data in a modulated data signal, such as a carrier wave or other transport mechanism, and can include any information delivery media. A "modulated data signal" can be a signal that has one or more of its characteristics set or changed in such a manner as to encode information in the signal. By way of example, and not limitation, communication media can include wired media such as a wired network or direct-wired connection, and wireless media such as acoustic, radio frequency (RF), microwave, infrared (IR) and other wireless media. The term computer readable media as used herein can include both storage media and communication media.

The computing device 300 can be implemented as a portion of a small-form factor portable (or mobile) electronic device such as a cell phone, a personal data assistant (PDA), a personal media player device, a wireless webwatch device, a personal headset device, an application specific device, or a hybrid device that include any of the above functions. The computing device 300 can also be implemented as a personal computer including both laptop computer and non-laptop computer configurations.

From the foregoing, it will be appreciated that specific embodiments of the disclosure have been described herein for purposes of illustration, but that various modifications may be made without deviating from the disclosure. In addition, many of the elements of one embodiment may be combined with other embodiments in addition to or in lieu of the elements of the other embodiments. Accordingly, the technology is not limited except as by the appended claims.

We claim:

1. A method of automatic digital image transcription during composition of an electronic message, the method comprising:
    importing, a digital image into a body section of an electronic message being composed in an email client at a client device;
    receiving, at the client device, a transcription command to automatically transcribe the imported digital image in the electronic message;
    in response to receiving the transcription command,
        transmitting a copy of the imported digital image to an email server interconnected to the client device via a computer network;
        performing, at the email server, text recognition based on patterns in the imported digital image to generate digital text data corresponding to the copy of the imported digital image;
        determining, at the server, a content format of the digital text data based on the imported digital image by recognizing one or more keywords or punctuations individually corresponding to a text structure;
        automatically applying, at the server, the determined content format to the generated digital text data such that the generated digital text data has the text structure corresponding to the recognized one or more keywords or punctuations, thereby typesetting the digital text data;
        providing a copy of the typeset digital text data to the client device from the email server via the computer network; and
        inserting and surfacing, at the client device, the provided copy of the typeset digital text data into a copy of the electronic message being composed in the email client; and
    upon receiving a user input to send the electronic message being composed at the email client, transmitting a copy of the electronic message with the inserted typeset digital text data to a destination.

2. The method of claim 1, further comprising:
    receiving a request from the user to import the digital image into the electronic message; and
    in response to receiving the request, importing the digital image into a body section of the electronic image; and
    wherein performing text recognition includes performing text recognition based on patterns in the imported digital image in the body section of the electronic message to generate digital text data corresponding to the imported digital image.

3. The method of claim 1 wherein performing pattern recognition includes performing text recognition based on pattern models to recognize handwritten patterns of characters in the imported digital image to generate digital text data corresponding to the imported digital image.

4. The method of claim 1 wherein:
    determining the content format includes determining one or more of a list, a table, or a paragraph according to which the digital text data is to be arranged; and
    automatically applying the determined content format includes automatically arranging the digital text data into one or more of a list, a table, or a paragraph.

5. The method of claim 1 wherein:
    determining the content format includes determining one or more of a list, a table, or a paragraph according to which the digital text data is to be arranged based on one or more of keywords, punctuations, or content appearance; and
    automatically applying the determined content format includes automatically arranging the digital text data into one or more of a list, a table, or a paragraph based on the one or more of keywords, punctuations, or content appearance.

6. The method of claim 1 wherein:
    the determined content format is a list; and
    automatically applying the determined content format includes:
        automatically arranging the digital text data into a column; and
        inserting one or more of bullet points or numerical headings in front of each entry in the column.

7. The method of claim 1 wherein inserting the typeset digital text data includes inserting the typeset digital text data into the copy of the electronic message being composed in place of the imported digital image.

8. The method of claim 1 wherein inserting the typeset digital text data includes inserting the typeset digital text data into the copy of the electronic message being composed in addition to the imported digital image.

9. The method of claim 1, further comprising:
    subsequent to inserting the typeset digital text data into the copy of the electronic message being composed,
        surfacing the inserted typeset digital text data to the user; and
        receiving one or more edits to the surfaced typeset digital text data before transmitting the electronic message with the typeset digital text data to the destination upon receiving the user input to send the electronic message being composed.

10. A computing device for processing electronic messages, the computing device being interconnected to a remote server via a computer network, wherein the computing device comprising:
    a processor; and
    a memory containing instructions executable by the processor to cause the computing device to:
        receive a command to transcribe an imported digital image in an electronic message being composed in an email client at the computing device; and
        in response to receiving the request, transmitting, from the computing device and via the computer network, a transcription request along with a copy of the imported digital image to the remote server, wherein the remote server is configured to:
            perform text recognition based on patterns in the received copy of the imported digital image to generate digital text data corresponding to the received copy of the imported digital image;

recognize one or more keywords or punctuations in the generated digital text data individually corresponding to a text structure;

automatically formatting the generated digital text data such that the generated digital text data has the text structure corresponding to the recognized one or more keywords or punctuations; and transmit, via the computer network, a copy of the digital text data with the text structure to the computing device; and upon receiving the copy of the digital text data with the text structure, insert the received copy of the digital text data with the text structure into the electronic message being composed at the email client; and upon receiving a user input to send the electronic message, transmit, via the computer network, the electronic message with the inserted digital text data to a destination.

11. The computing device of claim 10 wherein:

the remote server is also configured to:

recognize a content format of the digital text data based on the digital image; and automatically format the digital text data using the recognized content format to generate typeset digital text data; and to insert the received digital text data includes to insert the received typeset digital text data.

12. The computing device of claim 10 wherein:

the digital image contains data representing handwritten characters; and to insert the received digital text data includes to insert the received digital text data transcribed from the handwritten characters.

13. The computing device of claim 10 wherein:

the digital image contains data representing handwritten characters in a list; and to insert the received digital text data includes to insert the received digital text data transcribed from the handwritten characters in a list.

14. The computing device of claim 10 wherein:

the digital image contains data representing handwritten characters in a table; and to insert the received digital text data includes to insert the received digital text data transcribed from the handwritten characters in a table.

15. The computing device of claim 10 wherein to insert the received digital text data includes to insert the received digital text data into the electronic message being composed in addition to the imported digital image.

16. The computing device of claim 10 wherein to insert the received digital text data includes to insert the received digital text data into the electronic message being composed in place of the imported digital image.

17. A method of automatic digital image transcription during composition of an electronic message, the method comprising:

receiving, at an email server, (i) a transcription command from an email client at a client device of a user to transcribe an imported digital image in the electronic message at the client device and (ii) a copy of the imported digital image; and in response to receiving the transcription command from the client device, at the email server, performing text recognition based on patterns in the received copy of the imported digital image to generate digital text data corresponding to the received copy of the imported digital image;

determining a content format of the digital text data based on the received copy of the imported digital image by recognizing one or more keywords or punctuations individually corresponding to a text structure;

automatically applying the determined content format to the generated digital text data such that the generated digital text data has the text structure corresponding to the recognized one or more keywords or punctuations, thereby typesetting the digital text data;

inserting the typeset digital text data into a server copy of the electronic message at the email server; and transmitting a copy of the inserted typeset digital text data to the email client at the client device via synchronization of the server copy of the electronic message and a client copy of the electronic message at the client device; and upon receiving a user input to send the electronic message being composed, transmitting, from the email server, the electronic message with the inserted typeset digital text data to a destination.

18. The method of claim 17 wherein:

determining the content format includes determining one or more of a list, a table, or a paragraph according to which the digital text data is to be arranged; and automatically applying the determined content format includes automatically arranging the digital text data into one or more of a list, a table, or a paragraph.

19. The method of claim 17 wherein:

determining the content format includes determining one or more of a list, a table, or a paragraph according to which the digital text data is to be arranged based on one or more of keywords, punctuations, or content appearance; and automatically applying the determined content format includes automatically arranging the digital text data into one or more of a list, a table, or a paragraph based on the one or more of keywords, punctuations, or content appearance.

20. The method of claim 17 wherein:

the determined content format is a list; and automatically applying the determined content format includes:

automatically arranging the digital text data into a column; and inserting one or more of bullet points or numerical headings in front of each entry in the column.

\* \* \* \* \*